(12) United States Patent
Asao et al.

(10) Patent No.: US 11,077,563 B2
(45) Date of Patent: Aug. 3, 2021

(54) WORKPIECE PICKING DEVICE

(71) Applicant: FANUC CORPORATION, Yamanashi (JP)

(72) Inventors: Kyouhei Asao, Yamanashi (JP); Naoki Akagawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 278 days.

(21) Appl. No.: 16/054,128

(22) Filed: Aug. 3, 2018

(65) Prior Publication Data
US 2019/0070736 A1 Mar. 7, 2019

(30) Foreign Application Priority Data

Sep. 5, 2017 (JP) .............................. JP2017-170131

(51) Int. Cl.
*B25J 15/04* (2006.01)
*B25J 15/08* (2006.01)
*B23Q 7/04* (2006.01)
*B25J 9/16* (2006.01)
*B65H 3/06* (2006.01)
*B65H 3/48* (2006.01)

(52) U.S. Cl.
CPC .......... *B25J 15/0433* (2013.01); *B23Q 7/046* (2013.01); *B25J 9/1635* (2013.01); *B25J 15/08* (2013.01); *B65H 3/0653* (2013.01); *B65H 3/48* (2013.01); *B23Q 2240/00* (2013.01)

(58) Field of Classification Search
CPC ............................... B25J 15/0253; B65H 3/48
See application file for complete search history.

(56) References Cited

U.S. PATENT DOCUMENTS 4,418,837 A * 12/1983 Kontz .................. B65G 59/108
221/222
4,611,814 A 9/1986 Hiestand
4,648,771 A * 3/1987 Yoshioka ............... B65G 61/00
294/106

(Continued)

FOREIGN PATENT DOCUMENTS

CN 1043251 A 6/1990
CN 1583536 A 2/2005

(Continued)

OTHER PUBLICATIONS

Office Action dated Jun. 17, 2020, in corresponding German Application No. 10 2018 121 091.4, 17 pages.

(Continued)

*Primary Examiner* — Gerald McClain
(74) *Attorney, Agent, or Firm* — Maier & Maier, PLLC

(57) ABSTRACT

A picking device for picking up plate-like or pillar-shaped workpieces one at a time from the top of the workpieces stacked in the vertical direction, the workpiece picking device including: a chuck including a plurality of gripping claws arranged around a topmost workpiece, the plurality of gripping claws configured to grip a side surface of the topmost workpiece, the chuck being movable in a vertical direction; and an air blowing circuit provided inside at least one of the gripping claws, including a blowing port having an opening toward a second workpiece, the air blowing circuit configured to blow air downward from the blowing port.

4 Claims, 4 Drawing Sheets

(56) References Cited

U.S. PATENT DOCUMENTS

| | | | |
|---|---|---|---|
| 4,741,458 A * | 5/1988 | Odorici | B65G 59/105 |
| | | | 221/221 |
| 4,955,656 A | 9/1990 | Krogstrup et al. | |
| 5,102,292 A * | 4/1992 | Brinker | B65G 61/00 |
| | | | 414/796 |
| 5,234,207 A | 8/1993 | Lindstrom et al. | |
| 6,345,818 B1 | 2/2002 | Stephan et al. | |
| 7,747,205 B2 * | 6/2010 | Fujii | G03G 15/2028 |
| | | | 399/323 |
| 2009/0088898 A1 | 4/2009 | Nihei et al. | |
| 2009/0283958 A1 * | 11/2009 | Takahashi | B65H 3/48 |
| | | | 271/12 |
| 2010/0078876 A1 | 4/2010 | Bengtsson | |
| 2014/0169925 A1 | 6/2014 | Bando et al. | |
| 2017/0173800 A1 * | 6/2017 | Genefke | B25J 15/0014 |
| 2017/0190056 A1 * | 7/2017 | Lapham | B25J 9/042 |
| 2018/0229949 A1 * | 8/2018 | Fickler | B65G 59/108 |
| 2019/0070673 A1 * | 3/2019 | Asao | B25J 15/08 |

FOREIGN PATENT DOCUMENTS

| | | |
|---|---|---|
| CN | 205442101 U | 8/2016 |
| CN | 106113075 A | 11/2016 |
| EP | 0338720 A1 | 10/1989 |
| EP | 2042278 A2 | 4/2009 |
| JP | S64-22745 A | 1/1989 |
| JP | S64-53130 U | 4/1989 |
| JP | H02-053588 A | 2/1990 |
| JP | H04-45032 A | 2/1992 |
| JP | H05-051145 A | 3/1993 |
| JP | H06-13141 U | 2/1994 |
| JP | 06171772 A * | 6/1994 |
| JP | H06-171772 A | 6/1994 |
| JP | 2000-128344 A | 5/2000 |
| JP | 2002-127071 A | 5/2002 |
| JP | 2003-165082 A | 6/2003 |
| JP | 2003-312841 A | 11/2003 |
| JP | 2009-82997 A | 4/2009 |
| JP | 2016-023045 A | 2/2016 |
| WO | 94/01355 A1 | 1/1994 |

OTHER PUBLICATIONS

Office Action dated Mar. 18, 2020 in corresponding U.S. Appl. No. 16/054,083; 10 pages.

Office Action dated Nov. 18, 2019, in corresponding Chinese Application No. 201810965977.5; 12 pages.

Japanese Decision to Grant a Patent dated Aug. 13, 2019, in connection with corresponding JP Application No. 2017-170131 (5 pgs., including English translation).

Japanese Search Report dated Jul. 25, 2019, in connection with corresponding JP Application No. 2017-170131 (10 pgs., including English translation).

* cited by examiner

WORKPIECE PICKING DEVICE

CROSS-REFERENCE TO RELATED APPLICATIONS

This application is based on and claims priority to Japanese Patent Application No. 2017-170131 filed on Sep. 5, 2017, the content of which is incorporated herein by reference in its entirety.

TECHNICAL FIELD

The present invention relates to a workpiece picking device for picking up workpieces one at a time from the top of the stacked workpieces.

BACKGROUND ART

Conventionally, workpiece picking devices have been known that pick up workpieces one at a time from the top of the stacked workpieces (for example, see PTL 1 and PTL 2). When the topmost workpiece is lifted by the workpiece picking device, the second workpiece from the top may stick to the topmost workpiece and may be lifted together with the topmost workpiece. The apparatuses of PTL 1 and PTL 2 include means for separating the second workpiece from the topmost workpiece by injecting air from the side between the topmost workpiece and the second workpiece.

CITATION LIST

Patent Literature

{PTL 1}
Japanese Unexamined Patent Application, Publication No. 2016-023045
{PTL 2}
Japanese Unexamined Patent Application, Publication No. 2003-312841

SUMMARY OF INVENTION

One aspect of the present disclosure is a workpiece picking device configured to pick up plate-like or pillar-shaped workpieces one at a time from a top of the workpieces stacked in a vertical direction, the workpiece picking device including: a chuck including a plurality of gripping claws arranged around a topmost workpiece, the plurality of gripping claws configured to grip a side surface of the topmost workpiece, the chuck being movable in a vertical direction; and an air blowing circuit provided inside at least one of the gripping claws, including an blowing port having an opening toward a second workpiece, the air blowing circuit configured to blow air from the blowing port.

DESCRIPTION OF EMBODIMENTS

Figure 1:
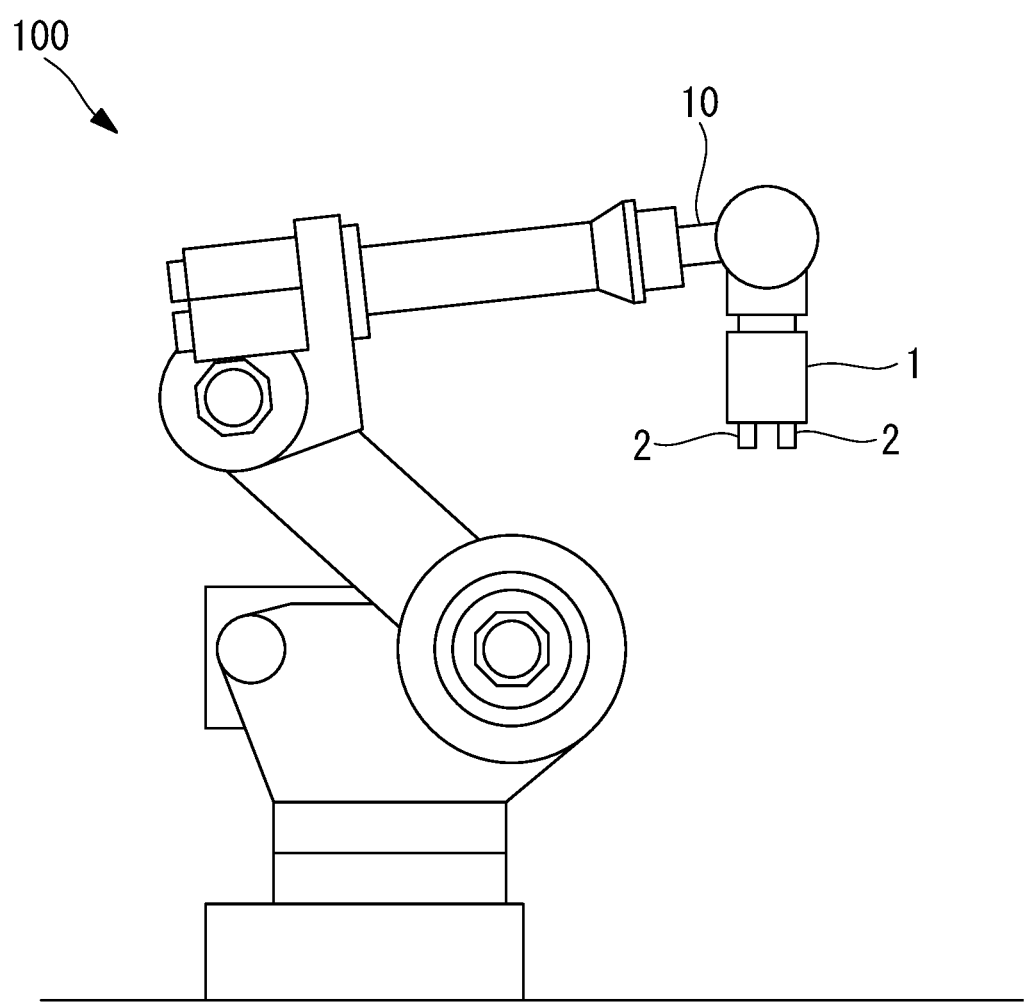
FIG. 1 is a general configuration diagram of a workpiece picking device according to an embodiment of the present invention.
Figure 2:
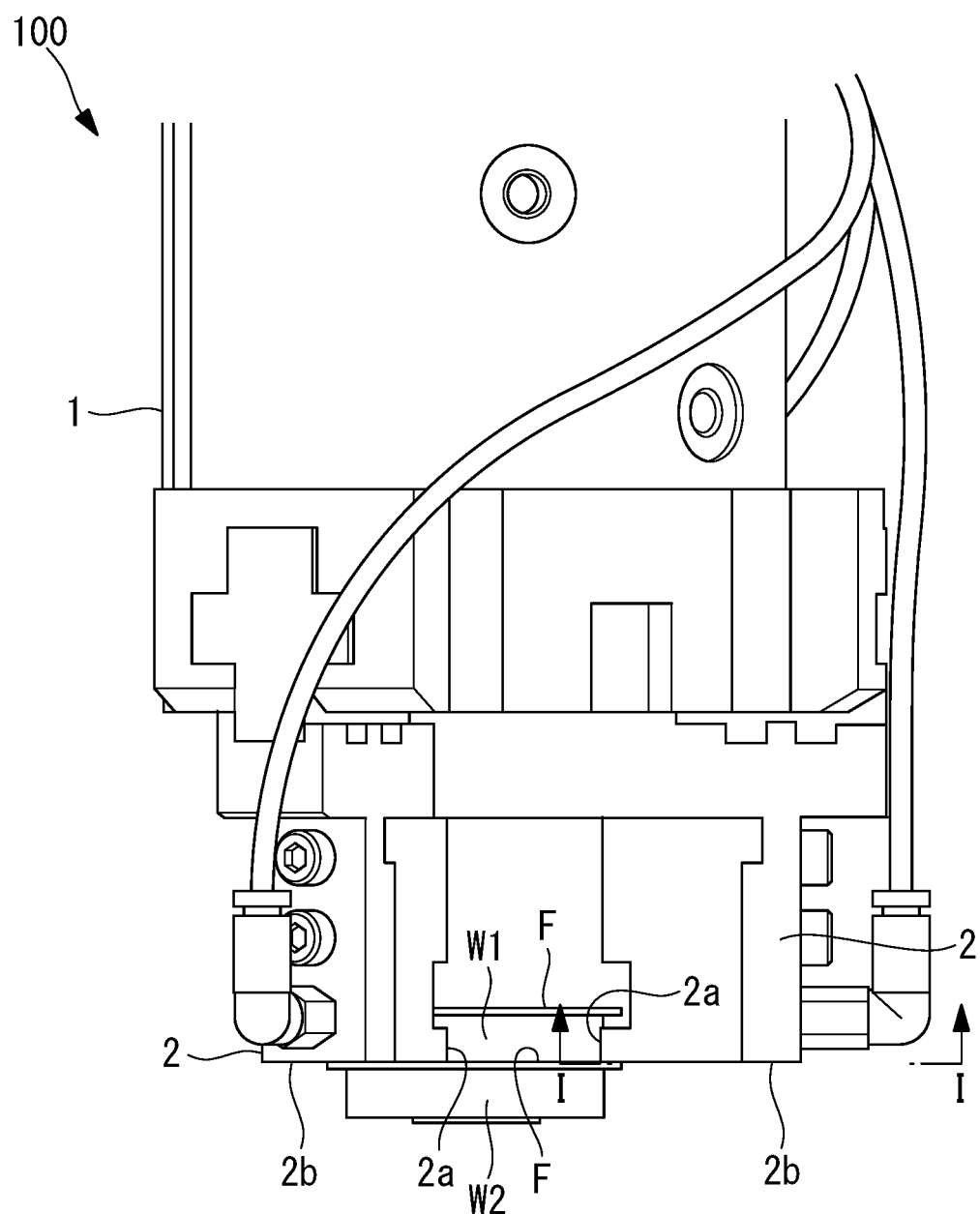
FIG. 2 is a partial external view of the workpiece picking device according to an embodiment of the present invention.

Referring to the drawings, a description is given of a workpiece picking device 100 according to an embodiment of the present invention.

The workpiece picking device 100 according to this embodiment is, for example, a robot for transfer that picks out workpieces W1, W2 . . . , which are stacked in a single stack in a vertical direction after machining, one at a time from the top, and transfers them to a predetermined transfer destination. The stacked workpieces W1, W2 . . . may adhere to each other due to an oil or the like that adhered to a surface at the time of machining. The workpiece picking device 100 is configured so that it can separate and transfer the workpieces W1, W2 . . . one at a time.

Specifically, as shown in FIG. 1 to FIG. 3A to 3C, the workpiece picking device 100 includes a chuck 1 including a plurality of gripping claws 2 for gripping the workpiece W1, and movable up and down in a vertical direction, and an air blowing circuit 3 built-in inside the gripping claw 2 for separating the topmost workpiece W1 from the second workpiece W2.

The workpiece picking device 100 of this embodiment is applied to disc-like or cylindrical workpieces W1, W2 . . . on top of which a flange F projecting radially outward than a side surface is provided. The workpieces W1, W2 . . . are stacked with the flanges F facing up.

As shown in FIG. 1, the workpiece picking device 100 is an articulated robot including an articulated robot arm 10 that can operate in three dimensions, and the chuck 1 is provided in a tip part of the robot arm 10. The chuck 1 is movable three dimensionally by operation of the robot arm 10, i.e., in the horizontal direction, up and down in the vertical direction, and an oblique direction between the upper side of the workpieces W1, W2 . . . and the upper side of a predetermined transfer destination. Instead of the articulated robot, the workpiece picking device 100 may be a SCARA robot or a loader.

The plurality of gripping claws 2 are provided in the lower part of the chuck 1, and they are equally arranged around the central axis X in the vertical direction so that they are arranged around the circumference of the topmost workpiece W1. In this embodiment, the configuration with three gripping claws 2 is assumed, and only two of the three gripping claws 2 are illustrated in the referred drawing.

The three gripping claws 2 are opened and closed by moving in a radial manner with respect to the central axis X, thereby gripping and releasing the workpiece W1. That is, the three gripping claws 2 are closed by simultaneously moving in the direction close to the central axis X, thereby gripping the side surface of the workpiece W1. Additionally, the three gripping claws 2 are opened by simultaneously moving in the direction away from the central axis X, thereby releasing the workpiece W1. A chuck surface 2a of the gripping claw 2 that is arranged inside (on the central-axis X side) and contacts the side surface of the workpiece W1 is curved around the central axis X so as to extend along the side surface of the workpiece W1.

An air blowing circuit 3 is provided inside at least one of the gripping claws 2, and is preferably provided inside all of the gripping claws 2. A blowing port 3a is provided in one end of the air blowing circuit 3, and the other end of the air blowing circuit 3 is connected to an air source (not shown). One end portion of the air blowing circuit 3 including the blowing port 3a inclines with respect to the vertical direction so as to be gradually displaced downward to the central-axis X side, and the blowing port 3a has an opening in a bottom surface 2b of the gripping claw 2 near the chuck surface 2a. Accordingly, when the three gripping claws 2 are gripping the side surface of the workpiece W1, the blowing port 3a is arranged such that the opening faces a flange F of the workpiece W2 at the position where the opening is opposite to the flange F of the second workpiece W2 in the vertical direction, and air A is blown obliquely downward from the blowing port 3a toward the flange F of the workpiece W2.

Additionally, the timings of the operations of the chuck 1 and the air blowing circuit 3 are controlled by a controller that is not shown, such that the blowing of the air A from the blowing port 3a is started before or simultaneously with the start of rising of the chuck 1, after the gripping claws 2 grip the workpiece W1.

Next, a description is given of the operation of the workpiece picking device 100 configured as described above. The stacked workpieces W1, W2 . . . are arranged below the chuck 1 such that the center of the workpieces W1, W2 . . . is located vertically downward the center of the three gripping claws 2.

Figure 3A:
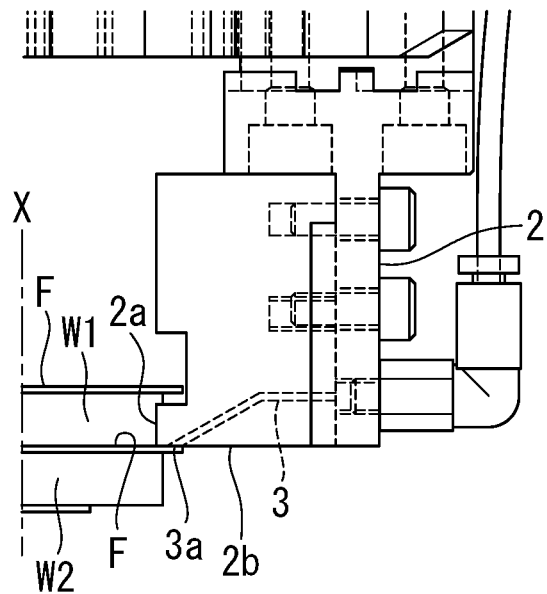
FIG. 3A is a diagram of the internal configuration of a gripping claw and the operation of the workpiece picking device of FIG. 2 illustrating the state where the topmost workpiece is gripped by the gripping claws.

When the operation of the workpiece picking device 100 is started, the chuck 1 is lowered to the position where the three gripping claws 2 surround the topmost workpiece W1, and subsequently, as shown in FIG. 3A, the side surface of the topmost workpiece W1 is gripped by the gripping claws 2 by closing the three gripping claws 2.

Figure 3B:
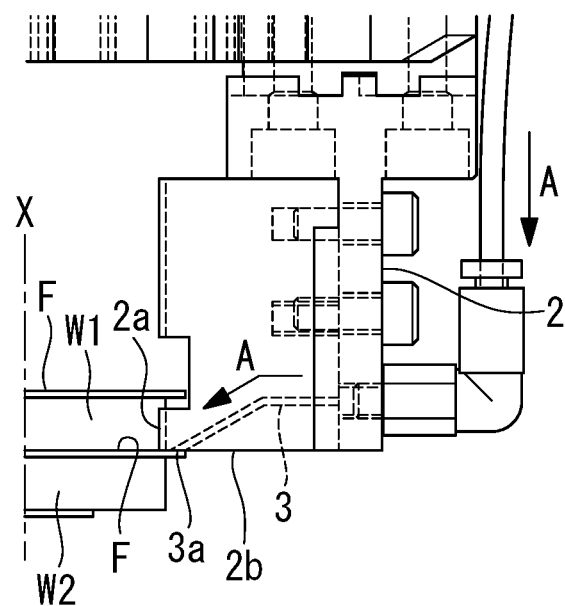
FIG. 3B is a diagram of the internal configuration of a gripping claw and the operation of the workpiece picking device of FIG. 2 illustrating the state where air is being blown from an air blowing circuit toward a second workpiece.

Next, as shown in FIG. 3B, the air A is supplied to the air blowing circuit 3 from the air source, and the air A is blown obliquely downward from the blowing port 3a. At this moment, when the workpiece W2 is adhering to the bottom of the workpiece W1, the flange F of the workpiece W2 is pressed downward by the air A from the blowing port 3a.

Figure 3C:
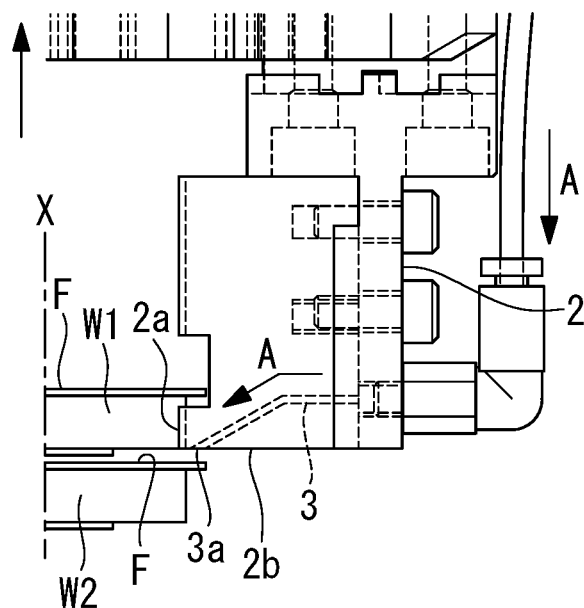
FIG. 3C is a diagram of the internal configuration of a gripping claw and the operation of the workpiece picking device of FIG. 2 illustrating the state where a chuck is raised.

Simultaneously with or after the start of blowing of the air A from the blowing port 3a, the chuck 1 starts to be raised, and the workpiece W1 is also raised together with the chuck 1. In the process in which the workpiece W1 is raised, the second workpiece W2 continues to be pressed downward by the air A from the blowing port 3a. Therefore, as shown in FIG. 3C, the workpiece W2 is reliably separated from the workpiece W1 that is raised, and only the workpiece W1 is lifted.

Next, the workpiece W1 is transferred above the predetermined transfer destination by the operation of the robot arm 10, and the workpiece W1 is placed on the predetermined transfer destination by opening the three gripping claws 2.

As described above, according to this embodiment, the workpiece picking device 100 is configured such that when the chuck 1 lifts the topmost workpiece W1, the second workpiece W2 is pressed downward by the air A blown downward from the blowing port 3a located above the workpiece W2. Therefore, in the process of lifting the workpiece W1, the workpiece W2 adhering to the bottom of the workpiece W1 can be reliably separated from the workpiece W1, and only the workpiece W1 can be picked up.

Additionally, since the air blowing circuit 31 is provided inside the gripping claw 2, compared with the case where the workpiece separator separate from the chuck 1 is provided outside the chuck 1, it is possible to reduce the size and cost of the whole device. Additionally, the separation of the workpiece W2 by blowing the air A is performed simultaneously with the raising of the workpiece W1. Accordingly, it is possible to separate the topmost workpiece W1 from the second workpiece W2 without extension of the takt time, compared with the takt time when only the chuck 1 is operated.

Figure 4:
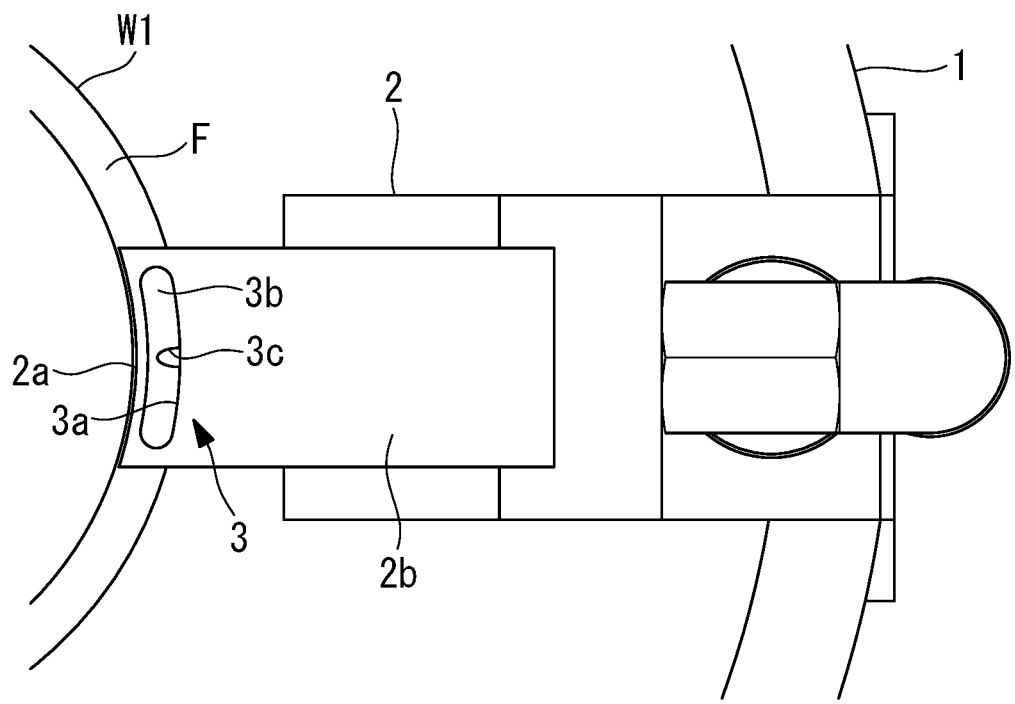
FIG. 4 is a diagram illustrating the gripping claw viewed from the bottom side in a modification of the workpiece picking device of FIG. 2, and also illustrating an example of an air pocket provided in the gripping claw.

In this embodiment, as shown in FIG. 4, the air blowing circuit 3 may be connected to the tip of the pipe 3c delivering the air A, may have an opening in the bottom surface 2b of the gripping claw 2, and may have an air pocket 3b having a cross sectional area larger than the cross sectional area of the pipe 3c (a cross-sectional area in the direction orthogonal to the flow direction of the air A). FIG. 4 is a bottom view taken along the I-I line in FIG. 2. The blowing port 3a consists of an opening of the air pocket 3b in the bottom surface 2b. It is preferable that the air pocket 3b is an arc-shape extending in the circumferential direction of the workpiece W2, such that the pressure of the air A can be made to effectively act on the flange F of the second workpiece W2.

By providing the air pocket 3b as described above, the flange F of the workpiece W2 can be pressed downward with a larger force by the air A blown from the blowing port 3a, and even the workpiece W2 adhering to the workpiece W1 with a large adhesion force can also be reliably separated.

In this embodiment, when the air blowing circuit 3 is provided to a plurality of gripping claws 2, a plurality of air blowing circuits 3 may blow the air A simultaneously, or may blow the air A in order.

Additionally, in this embodiment, the blowing port 3a has the opening in the bottom surface 2b of the gripping claw 2. However, the arrangement of the blowing port 3a is not limited to this, and the arrangement of the blowing port 3a may be changed, as long as the blowing port 3a has the opening toward the workpiece W2 above the workpiece W2, and the workpiece W2 can be pressed downward by the air A from the blowing port 3a. For example, the blowing port 3a may be provided at the tip of a nozzle projecting from the bottom surface 2b or a side surface of the gripping claw 2.

Additionally, the workpieces to which the workpiece picking device 100 according to this embodiment is applied are not limited to the workpieces W1, W2 . . . with the flange F, and may also be the workpieces without the flange F.

Even in the case of the workpieces without the flange F, the workpiece W2 can be pressed downward by the air A blown obliquely downward from the blowing port 3a toward the side surface of the second workpiece W2. Therefore, the workpiece W2 can be separated from the workpiece W1.

From the above-described embodiments, the following aspects of the present disclosure are derived.

One aspect of the present disclosure is a workpiece picking device configured to pick up plate-like or pillar-shaped workpieces one at a time from a top of the workpieces stacked in a vertical direction, the workpiece picking device including: a chuck including a plurality of gripping claws arranged around a topmost workpiece, the plurality of gripping claws configured to grip a side surface of the topmost workpiece, the chuck being movable in a vertical direction; and an air blowing circuit provided inside at least one of the gripping claws, including an blowing port having an opening toward a second workpiece, the air blowing circuit configured to blow air from the blowing port.

According to this aspect, among the plurality of workpieces arranged below the chuck, the topmost workpiece is gripped by the plurality of gripping claws, and in this state, the chuck is raised in the vertical direction. Thus, the workpieces can be picked up in order from the top.

In this case, the second workpiece is pressed downward by blowing the air downward from the blowing port of at least one of the gripping claws toward the second workpiece by the operation of the air blowing circuit. Then, the topmost workpiece is raised by raising the chuck in the state where the second workpiece is pressed downward by the air. Thus, the second workpiece is separated from the topmost workpiece.

Therefore, by providing the separator inside the gripping claw, the separator can be provided without increasing the size of the whole device. Additionally, it is possible to separate the topmost workpiece from the second workpiece simultaneously with the lifting of the topmost workpiece, without extending the takt time.

In the above aspect, the air blowing circuit may include a pipe for delivering the air, and an air pocket connected to a tip of the pipe, having an opening in a bottom surface of the at least one of the gripping claws, and having a cross sectional area larger than the pipe.

In this way, it is possible to increase the pressure of the air that acts on the second workpiece, and to reliably separate the workpieces.

In the above aspect, an arm that can move the chuck three dimensionally between an upper side of the stacked workpieces and an upper side of a predetermined transfer destination may be provided.

In this way, the workpiece picking device can be used as a transfer device that transfers workpieces to the predetermined transfer destination.

According to the aforementioned aspects, the effect is achieved that means for separating the topmost workpiece from the second workpiece can be mounted without increasing the size of the device, and both of the workpieces can be separated from each other without extending the takt time.

REFERENCE SIGNS LIST

100 workpiece picking device
1 chuck
2 gripping claw
2*a* chuck surface
2*b* bottom surface
3 air blowing circuit
3*a* blowing port
3*b* air pocket
10 robot arm (arm)
W1, W2 workpiece
F flange

The invention claimed is:

1. A workpiece picking device configured to pick up plate-shaped or pillar-shaped workpieces one at a time from a top of the workpieces stacked in a vertical direction, the workpiece picking device comprising:
    a chuck including a plurality of gripping claws arranged around a topmost workpiece, the plurality of gripping claws configured to grip a side surface of the topmost workpiece, the chuck being movable in a vertical direction; and
    an air blowing circuit provided inside at least one of the gripping claws, including a blowing port having an opening facing downward along a central-axis in a vertical direction and toward a second workpiece, the blowing port further having an output on a bottom surface of the gripping claw, the air blowing circuit configured to blow air from the blowing port upon an area beneath a bottom surface of the topmost workpiece and above a top surface of the second workpiece, wherein the chuck moves in an upward direction while the blowing port simultaneously blows air upon the second workpiece to press the second workpiece downwardly.

2. The workpiece picking device according to claim 1, wherein the air blowing circuit includes:
    a pipe for delivering the air; and
    an air pocket connected to a tip of the pipe, having an opening in a bottom surface of the at least one of the gripping claws, and having a cross sectional area larger than the pipe.

3. The workpiece picking device according to claim 1, comprising an arm that can move the chuck three dimensionally between an upper side of the stacked workpieces and an upper side of a predetermined transfer destination.

4. The workpiece picking device according to claim 1, wherein one end portion of the air blowing circuit, including the blowing port, inclines with respect to the vertical direction so as to be gradually displaced downward to the central-axis side; and
    the blowing port is arranged such that the opening faces a flange of the second workpiece at a position where the opening is opposite to the flange in the vertical direction.

* * * * *